United States Patent [19]
Fleischfresser et al.
[11] 3,812,299
[45] May 21, 1974

[54] ARRANGEMENT FOR PROTECTING A COMMON HIGHWAY IN A COMMON CONTROL COMMUNICATION SWITCHING SYSTEM

[75] Inventors: Gerald H. Fleischfresser, Chicago; Truman R. Mila, Lombard, both of Ill.

[73] Assignee: GTE Automatic Electric Laboratories Incorporated, Northlake, Ill.

[22] Filed: Mar. 28, 1973

[21] Appl. No.: 345,627

[52] U.S. Cl. .......... 179/18 AH, 179/175.2 C
[51] Int. Cl. .......... H04m 3/08
[58] Field of Search ...... 179/18 AH, 18 AG, 18 ES, 179/18 AB, 15 BF, 175.2 R, 175.2 C, 18 FG, 18 FF

[56] References Cited

UNITED STATES PATENTS

| | | | |
|---|---|---|---|
| 3,764,751 | 10/1973 | Padgett | 179/18 FG |
| 3,496,303 | 2/1970 | Pharis | 179/18 AH |
| 3,564,149 | 2/1971 | Funk | 179/18 ES |

*Primary Examiner*—Kathleen H. Claffy
*Assistant Examiner*—David L. Stewart
*Attorney, Agent, or Firm*—B. E. Franz

[57] ABSTRACT

An arrangement is provided for protecting a common highway in a common control communication switching system of the type having full redundancy of the common control equipment, but not the trunks. In the particularly disclosed system, a truck type signal generator means is associated with each trunk and gates the truck type information onto both of the common highways servicing the "on-line" and "off-line" markers so that both markers can see the information and respond alike to maintain synchronous operation. The disclosed arrangement prevents any trunk type signal generator means which have failed on or are shorted from contaminating both common highways.

8 Claims, 3 Drawing Figures

ARRANGEMENT FOR PROTECTING A COMMON HIGHWAY IN A COMMON CONTROL COMMUNICATION SWITCHING SYSTEM

BACKGROUND OF THE INVENTION

This invention relates to a centralized automatic message accounting system and, more particularly, to an arrangement for protecting a common highway in such a system.

In the hereinafter described centralized automatic message accounting system, full redundancy of the common control circuitry is provided, for reliability. In transmitting the class of service, or trunk type, from the trunks to the marker in the system, the marker turns on a pull negative driver to gate the information onto the common highway. A pull negative driver is associated with each trunk, and gates the information onto both the common highway for the on-line marker and the common highway for the off-line marker so that both can see the information and respond alike to maintain synchronous operation.

In an arrangement of this type having full redundancy of the common control circuitry but not the trunks, office outages due to failed on or shorted pull negative drivers can contaminate both common highways, regardless of which marker was on-line. The trunk type of the trunk associated with the faulty pull negative driver would be superimposed on the data relating to the selected trunk.

Accordingly, it is an object of the present invention to provide an improved centralized automatic message accounting system.

More particularly, it is an object to provide an arrangement for protecting a common highway in such a centralized automatic message accounting system.

More particularly still, it is an object to provide an arrangement for protecting a common highway in such a system from contamination due to failure of the apparatus for transmitting the class of service, or trunk type, of a trunk, from the trunks to the marker.

A still further object is to provide an arrangement for protecting a common highway from such failures, by blocking the data from the common highways in such a fashion only the trunk frame associated with the faulty apparatus is blocked, thus freeing the common highways for use by the remainder of the office.

A still further object is to provide an arrangement wherein the data is blocked from the common highways in the event a trunk frame is enabled for longer than an established time interval, thereby further protecting the common highways from contamination.

Still another object is to provide an arrangement using duplicated monitoring circuitry so that a component failure in the monitoring circuitry will only effect one common highway.

Other objects of the invention will in part be obvious and will in part appear hereinafter.

For a fuller understanding of the nature and objects of the invention, reference should be had to the following detailed description taken in connection with the accompanying drawings, in which.

Similar reference characters refer to similar parts throughout the several views of the drawings.

DESCRIPTION OF THE INVENTION

Figure 1:
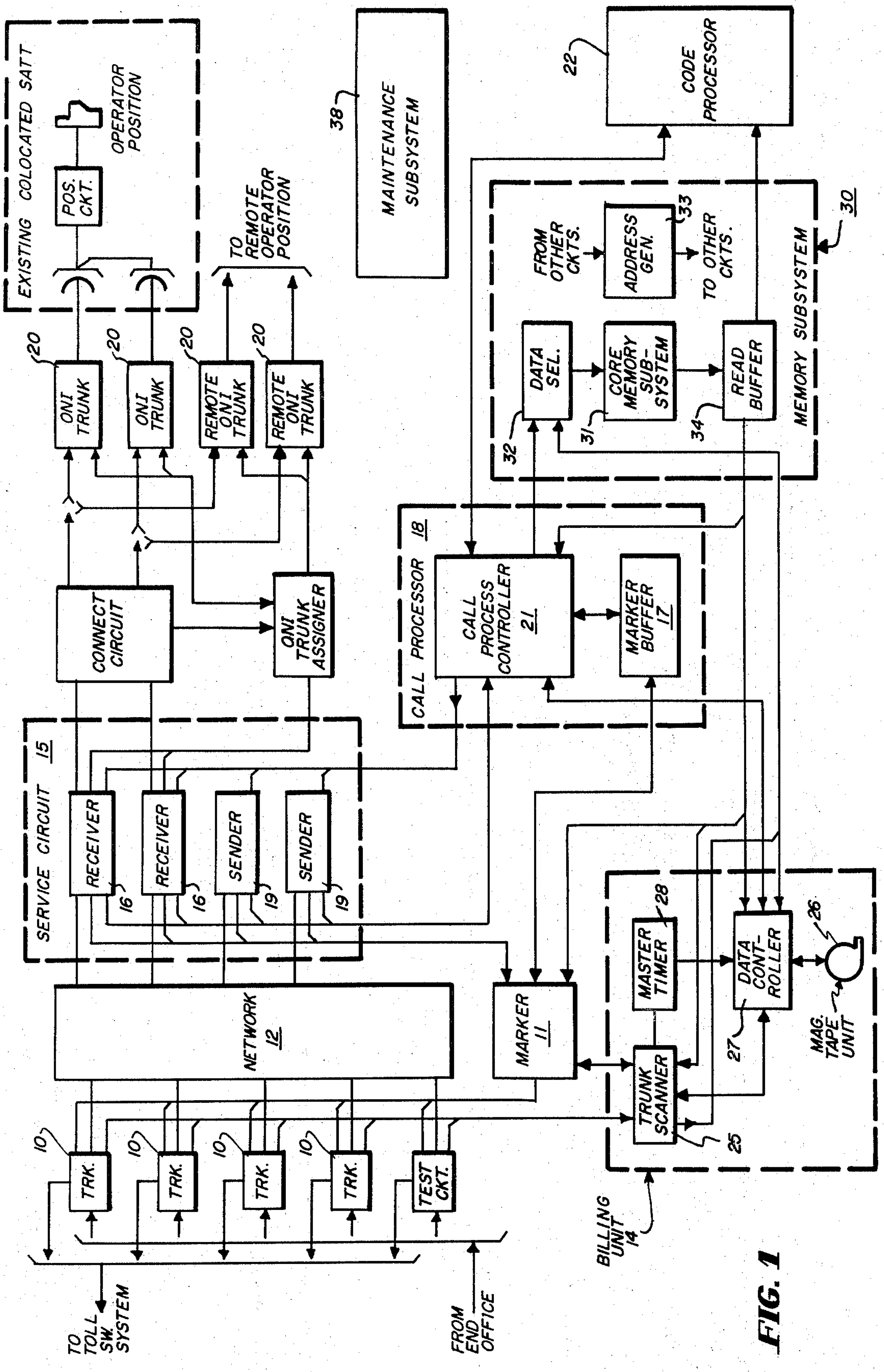
FIG. 1 is a block diagram schematic of the centralized automatic message accounting system.

Referring now to the drawings, in FIG. 1 the centralized automatic message accounting system is illustrated in block diagram, and the functions of the principal equipment elements can be generally described as follows. The trunks 10, which may be either multifrequency (MF) trunks or dial pulse (DP) trunks, provide an interface between the originating office, the toll switching system, the marker 11, the switching network 12, and the billing unit 14. The switching network 12 consists of three stages of matrix switching equipment between its inlets and outlets. A suitable distribution of links between matrices are provided to insure that every inlet has full access to every outlet for any given size of the switching network. The three stages, which consist of A, B and C crosspoint matrices, are interconnected by AB and BC links. The network provides a minimum of 80 inlets, up to a maximum of 2,000 inlets and 80 outlets. Each inlet extends into an A matrix and is defined by an inlet address. Each outlet extends from a C matrix to a terminal and is defined by an outlet address.

Each full size network is divided into a maximum of 25 trunk grids on the inlet side of the network and a service grid with a maximum of 16 arrays on the outlet side of the network. The trunk grids and service grid within the networks are interconnected by the BC link sets of 16 links per set. Each MF trunk grid is provided for 80 inlets. Each DP trunk grid is provided for 40 inlets. The service grid is provided for a maximum of 80 outlets. A BC link is defined as the interconnection of an outlet of a B matrix in a trunk grid and an inlet of a C matrix in the service grid.

The marker 11 is the electronic control for establishing paths through the electromechanical network. The marker constantly scans the trunks for a call for service. When the marker 11 identifies a trunk with a call for service, it determines the trunk type, and establishes a physical connection between the trunk and a proper receiver 16 in the service circuits 15.

The trunk identity and type, along with the receiver identity, are temporarily stored in a marker buffer 17 in the call processor 18 which interfaces the marker 11 and the call processor 18.

When the call processor 18 has stored all of the information transmitted from a receiver, it signals the marker 11 that a particular trunk requires a sender 19. The marker identifies an available sender, establishes a physical connection from the trunk to the sender, and informs the call processor 18 of the trunk and sender identities.

The functions of the receivers 16 are to receive MF 2/6 tones or DP signals representing the called number, and to convert them to an electronic 2/5 output and present them to the call processor 18. A calling number is received by MF 2/6 tones only. The receivers will also accept commands from the call processor 18, and interface with the ONI trunks 20.

The function of the MF senders are to accept commands from the call processor 18, convert them to MF 2/6 tones and send them to the toll switch.

The call processor 18 provides call processing control and, in addition, provides temporary storage of the called and calling telephone numbers, the identity of the trunk which is being used to handle the call, and other necessary information. This information forms part of the initial entry for billing purposes in a multi-entry system. Once this information is passed to the billing unit 14, where a complete initial entry is formated, the call will be forwarded to the toll switch for routing.

The call processor 18 consists of the marker buffer 17 and a call processor controller 21. There are 77 call stores in the call processor 18, each call store handling one call at a time. The call processor 18 operates on the 77 call stores on a time-shared basis. Each call store has a unique time slot, and the access time for all 77 call stores is equal to 39.4 MS, plus or minus 1 percent.

The marker buffer 17 is the electronic interface between the marker 11 and the call processor controller 21. Its primary functions are to receive from the marker 11 the identities of the trunk, receiver or sender, and the trunk type. This information is forwarded to the appropriate call store.

The operation of the call process controller revolves around the call store. The call store is a section of memory allocated for the processing of a call, and the call process controller 21 operates on the 77 call stores sequentially. Each call store has eight rows and each row consists of 50 bits of information. The first and second rows are repeated in rows 7 and 8, respectively. Each row consists of two physical memory words of 26 bits per word. Twenty-five bits of each word are used for storage of data, and the 26th bit is a parity bit.

The call processor controller 21 makes use of the information stored in the call store to control the progress of the call. It performs digit accumulation and the sequencing of digits to be sent. It performs fourth digit 0/1 blocking on a 6 or 10 digit call. It interfaces with the receivers 16, the senders 19, the code processor 22, the billing unit 14, and the marker buffer 17 to control the call.

The main purpose of the code processor 22 is to analyze call destination codes in order to perform screening, prefixing and code conversion operations of a nature which are originating point dependent. This code processing is peculiar to the needs of direct distance dialing (DDD) originating traffic and is not concerned with trunk selection and alternate routing, which are regular translation functions of the associated toll switching machine. The code processor 22 is accessed only by the call processor 18 on a demand basis.

The billing unit 14 receives and organizes the call billing data, and transcribes it onto magnetic tape. A multi-entry tape format is used, and data is entered into tape via a tape transport operating in a continuous recording mode. After the calling and called director numbers, trunk identity, and class of service information is checked and placed in storage, the billing unit 14 is accessed by the call process controller 21. At this time, the call record information is transmitted into the billing unit 14 where it is formated and subsequently recorded on magnetic tape. The initial entry will include the time. Additional entries to the billing unit 14 contain answer and disconnect information.

The trunk scanner 25 is the means of conveying the various states of the trunks to the billing unit 14. The trunk scanner 25 is connected to the trunks by a highway extending from the billing unit 14 to each trunk. Potentials on the highway leads will indicate states in the trunks.

Each distinct entry (initial, answer, disconnect) will contain a unique entry identity code as an aid to the electronic data processing (EDP) equipment in consolidating the multi-entry call records into toll billing statements. The billing unit 14 will provide the correct entry identifier code. The magnetic tape unit 26 is comprised of the magnetic tape transport and the drive, storage and control electronics required to read and write data from and to the nine channel billing tape. The read function will allow the tape unit to be used to update the memory.

The recorder operates in the continuous mode at a speed of 5 inches per second, and a packing density of 800 bits per inch. Billing data is recorded in a multi-entry format using a 9 bit EBCDIC character (extended binary coded decimal interchange code). The memory subsystem 30 serves as the temporary storage of the call record, as the permanent storage of the code tables for the code processor 22, and as the alterable storage of the trunk status used by the trunk scanner 25.

The core memory 31 is composed of ferrite cores as the storage elements, and electronic circuits are used to energize and determine the status of the cores. The core memory 31 is of the random access, destructive readout type, 26 bits per word with 16 K words.

For storage, data is presented to the core memory data registers by the data selector 32. The address generator 33 provides the address or core storage locations which activate the proper read/write circuits representing one word. The proper clear/write command allows the data selected by the data selector 32 to be transferred to the core storage registers for storage into the addressed core location.

For readout, the address generator 33 provides the address or core storage location of the word which is to be read out of memory. The proper read/restore command allows the data contained in the word read out, to be presented to the read buffer 34. With a read/-restore command, the data being read out is also returned to core memory for storage at its previous location.

The method of operation of a typical call in the system, assuming the incoming call is via an MF trunk can be described as follows. When a trunk circuit 10 recognizes the seizure from the originating office, it will provide an off-hook to the originating office and initiate a call-for-service to the marker 11. The marker 11 will check the equipment group and position scanners to identify the trunk that is requesting service. Identification will result in an assignment of a unique four digit 2/5 coded equipment identity number. Through a trunk-type determination, the marker 11 determines the type of receiver 16 required and a receiver/sender scanner hunts for an idle receiver 16. Having uniquely identified the trunk and receiver, the marker 11 makes the connection through the three-stage matrix switching network 12 and requests the marker buffer 17 for service.

The call-for-service by the marker 11 is recognized by the marker buffer 17 and the equipment and receiver identities are loaded into a receiver register of the marker buffer 17. The marker buffer 17 now scans the memory for an idle call store to be allocated for processing the call, under control of the call process controller 21. Detection of an idle call store will cause the equipment and receiver identities to be dumped into the call store. At this time, the call process controller 21 will instruct the receiver 16 to remove delay dial and the system is now ready to receive digits.

Upon receipt of a digit, the receiver 16 decodes that digit into 2/5 code and times the duration of digit presentation by the calling end. Once it is ascertained that the digit is valid, it is presented to the call processor 18 for a duration of no less than 50 milliseconds of digit and 50 milliseconds of interdigital pause for storage in the called store. After receipt of "ST," the call processor controller 21 will command the receiver 16 to instruct the trunk circuit 10 to return an off-hook to the calling office, and it will request the code processor 22.

The code processor 22 utilizes the called number to check for EAS blocking and other functions. Upon completion of the analysis, the code processor 22 will send to the call processor controller 21 information to route the call to an announcement or tone trunk, at up to four prefix digits if required, or provide delete information pertinent to the called number. It the call processor controller 21 determined that the call is an ANI call, it will receive, accumulate and store the calling number in the same manner as was done with the called number. After the call process controller 21 receives ST, it will request the billing unit 14 for storage of an initial entry in the billing unit memory. It will also command the receiver 16 to drop the trunk to receiver connection. The call processor controller 21 now initiates a request to the marker 11 via the marker buffer 17 for a trunk to sender connection. Once the marker 11 has made the connection and has transferred the identities to the marker buffer 17, the marker buffer will dump this information into the appropriate call store. The call processor controller 21 now interrogates the sender 19 for information that delay dial has been removed by the routing switch (crosspoint tandem or similar). Upon receipt of this information the call processor controller 21 will initiate the sending of digits including KP and ST. The call process controller 21 will control the duration of tones and interdigital pause. After sending of ST, the call processor 18 will await the receipt of the matrix release signal from the sender 19. Receipt of this signal will indicate that the call has been dropped. At this time, the sender and call store are returned to idle, ready to process a new call.

The initial entry information when dumped from the call store is organized into the proper format and stored in the billing unit memory. Eventually, the call answer and disconnect entries will also be stored in the billing unit memory. The initial entry will consist of approximately 40 characters and trunk scanner 25 entries for answer or disconnect contain approximately 20 characters. These entries will be temporarily stored in the billing unit memory until a sufficient number have been accumulated to comprise one data block of 1,370 characters. Once the billing unit memory is filled, the magnetic tape unit 26 is called and the contents of the billing unit memory is recorded onto the magnetic tape.

The final result of actions taken by the system on a valid call will be a permanent record of billing information stored on magnetic tape in multi-entry format consisting of initial, answer, and disconnect or forced disconnect entries.

As indicated above, the main purpose of the marker 11 is to provide control logic for associating any one out of up to 2,000 trunks to one of a smaller number of receivers 16 and senders 19 of the service circuit 15. The marker 11 controls the associated matrix or switching network 12 to establish this as a physical connection. The marker 11 also determines the equipment number of the trunk requesting service, and of the receiver 16 or sender 19 to which the trunk is connected. This information is sent to the call processor 18 to permit logical control of a call, once the trunk to receiver 16, or sender 19, circuit path is established.

Full redundancy of the common control circuitry is provided within the system, for reliability. Accordingly, there are two markers within the system and these markers operate in synchronism, although only one marker at a time is "on-line." Where practical, separate communication highways are provided between the markers and the various other subsystems. Comparisons between markers are made whenever non-synchronous data is presented as well as when information is transferred to the call processor 18 or the billing unit 14.

The operation and logic flow of the marker 11 is generally as follows. The call for service detection routine is activated by setting mode count zero, MCO. First, a group counter which generates the trunk group number consisting of two digits, tens 0–5 and units 0–9, in 2 out of 5 code, is advanced by one count. An AC signal is generated to interrogate 40 trunks for a call for service, and response in the form of eight bits of information, 40 bits in all, are returned on an AC highway.

The 40 bits are stored in the marker 11. If there are no calls for service, indicated by the absence of marks in the 40 bits, the group counter is advanced and another group of 40 trunks are interrogated. This is repeated until a call for service is found or group count 00 is reached. On group count 00, a check is made for special calls for service. Either a request for sender or a forced disconnect sequence can be initiated at this time. If none are found, the routining sequence will begin.

If a group call for service is found, the marker 11 advances to mode count 1, MC1. A position counter which examines the 40 call for service bits received from a trunk group is then advanced until the first call for service is detected. The detection consists of 40 gates enabled one at a time under control of the position counter. The position counter operates with two digits, a tens 0–4 and a units 0–7, counting in 2 out of 5 code.

A check is made to determine if this call for service is one associated with a maintenance connection. If the trunk number stored in the group and position counters matches that in a maintenance buffer, it will be treated as a maintenance call. This activates a maintenance call busy check signal to the service circuit 15 permitting the marker 11 to connect to a receiver 16 or sender 19 that has been manually busied but not call busied. It is not necessary, however, to preselect a receiver or sender for a maintenance call.

Each decision made in the marker 11 which depends on non-synchronous information is provided with a recheck routine. If the two markers see different inputs, the information is cleared and re-interrogated. If the markers still disagree, a print-out is made, and the off-line marker returns to idle, and the on-line marker continues to process the call.

Once the position of the calling trunk is found, the marker 11 advances to mode count two, MC2, where an associated pull negative driver, PND, is operated. The pull negative drivers PND are located in the trunk frames, and the operation of one of them activates a trunk type signal to the trunk frame electronics. Provisions are made for identification of up to five types of trunks, by strapping in the trunk frames. After a 500 microsecond delay, the marker 11 makes an AC interrogation of the trunk frame. The information is then presented to the receivers 16 to enable any receiver pool that can serve the indicated trunk type.

Operation of a pull negative driver PND probes the network 12 for possible paths through it. The pull negative driver potential from the trunk through the A and B matrix is presented to the C matrix which combines it with the respective service circuit idle indication. The output forms the receiver available signal. The C matrix, in mode count 3, MC3, is interrogated on an AC basis for available outlets. All 80 outlets are examined at one time to determine if there is at least one outlet available. If successful, an outlet scanner examines the 80 outlets, one at a time, to locate the "first" available receiver.

It the receiver available signals indicate that there are no paths for this trunk with associated idle receivers, the marker 11 returns to look for other calls for service.

If this had been a request for sender from the call processor 18, the marker will set a bit, "can't complete — retry," to indicate the blockage and clear the call from the buffer.

The marker advances to mode count four, MC4, and conditions A-B and B-C stage blocking devices to their forced non-blocking state. This is done at this time to insure a low potential within the network 12 during switching.

Mode count four, MC4, also operates a pull positive driver, PPD, associated with the selected outlet/-receiver, to pull the matrix. The selection is accomplished by activating a two digit code, 1/10 and 1/8.

At this time, the marker 11 knows the outlet number but not the associated service circuit number. The pull positive driver potential presented to the service circuit frames conditions one of the service circuits to respond. After a 500 microsecond delay, starting from the operation of the pull positive driver PPD, an AC interrogation is made. The service circuit responds with a two digit code for service circuit number. The units digit is a 2/5 code while the tens digit is a 1/10 code.

The marker advances to mode count five, MC5. After a 2.0 microsecond delay, from the pull positive driver PPD command, to insure operation of the matrix, a foreign potential check is made. The trunk and service circuit are configured at this time so that a potential may be applied at the service circuit end, and seriesed through the T, R, H and C matrix leads. The foreign potential test circuitry is located in the service circuit frames. The main battery MBS and main ground MGS switches and associated detectors are physically located in the service circuit frame. The foreign potential switch is enabled and after a 1.5 millisecond delay for settling, an AC interrogation is made for current flow. If current flow is detected, a print-out is initiated indicating that a foreign potential is present.

Assuming that no foreign potentials were present, the marker 11 advances to mode count 6, MC6, and re-interrogates for the call for service mark. Lack of a mark at this time indicates an abandoned call. The trunk is designed such that when the call is abandoned after the call for service recheck, the trunk will still maintain the matrix connection for an "interlock" interval.

If the call for service is still present, the marker in MC6, sets up the connection. Operation of the main ground MGS and main battery MBS switches will start the trunk and receiver switch through. The marker will wait 2.4 milliseconds for the switch through.

After the potentials have been applied and time allowed for switch through, the trunk and service circuit are re-interrogated for switch through, during mode count seven, MC7. Absence of the trunk call for service mark and absence of a service circuit number denotes that the connection has been made. The circuits are pulled through the series connection of the matrix conductors. Lack of continuity will prevent the circuits from pulling and will be detected by the marker during the switch through interrogation. If only one circuit switched through, the problem is in the circuit at the opposite end of the matrix.

Next a check is made to determine if a matrix hold winding is shorted. The pull positive driver PPD is turned off thereby "opening" the operate windings. After 2.4 milliseconds, the trunk type signal is removed from the service circuits. This initiates an action in the receiver which after 2.4+ milliseconds irreversibly removes it from the service circuit pool. Once this happens, the release can no longer be achieved in the marker. The marker waits 2.4 milliseconds after the removal of the trunk type signal, advances to mode count eight MC8 and rechecks the call for service mark.

Presence of the call for service mark at this time indicates a shorted hold winding. The marker responds by generating a print-out and releasing the connection.

Next, the information is transferred to the call processor 18, and a signal is returned indicating that the information has been loaded and that the marker is free to handle another call.

If this had been a request for a sender or a forced disconnect call, the marker would start a regular call for service search. If this had been a regular trunk call for service connection, the marker would check the buffers for a request for sender or forced disconnect call to be served.

A request for a sender from the call processor 18 is handled similar to a call for service from the trunks. The marker presents an idle indication to the call processor 18 to indicate the buffer storage is available for a request for sender. This buffer is provided to store the sender request information until the marker can serve the buffer. The buffer will be interrogated at the completion of a system call for service search or after completion of a trunk to receiver connection.

This type of call differs in that the trunk number must be loaded into the group and position counters. The trunk type interrogation circuitry is checked for 0/5 and a "sender" trunk type signal is generated by the marker and presented to the service circuit.

Operation of the pull negative driver PND with the trunk in this configuration will generate a call for service as long as the subscriber is still present. An abandoned call at this time will result in the marker signaling the call processor 18 "can't complete — clear." The marker sends the data control signal "2" coded in 2/5 code for an abandoned call or connection failure due to equipment problems. If the connection cannot be made due to busy senders or paths, the call processor 18 will be informed, "can't complete — retry."

The forced disconnect routine in the marker is similar to the request for sender routine, except communication is with the billing unit 14 via a separate buffer. A forced disconnect call for service will result in a signal from the marker to service circuit that this is a MF call in order to properly condition the receivers for forced disconnect. This will be done regardless of the type of trunk being served. The call processor 18 is signaled that this is a forced disconnect.

From the above description, it can be seen that the marker 11 turns on a pull negative driver PND to gate the class of service, or trunk type, onto the common highway. This information is gated onto both the common highways for the "on-line" marker and the "off-line" marker so that both markers receive and respond alike to it to maintain synchronous operation.

This leaves the system vulnerable to office outages due to failed on or shorted pull negative drivers. If such a fault should occur, the common highways would have the trunk type of the associated trunk superimposed on the data of the selected trunk. This would contaminate both common highways regardless of which marker is "on-line."

The pull negative driver PND which gates the data onto the common highways should only be on when the trunk frame within which it is included is enabled. By monitoring for the presence of a potential from a pull negative driver PND whenever its associated trunk frame is not enabled, this fault condition can be detected. Once detected, the data may be blocked from the common highways for that trunk from thereby freeing the highway for use by the remainder of the office.

Also, during normal operation, the trunk frame is enabled for several milliseconds at a time. If this time interval is exceeded, that trunk frame is blocked access to the common highway.

The monitoring circuitry furthermore is duplicated so that a component failure in this monitoring circuitry will only effect one highway.

Figure 2:
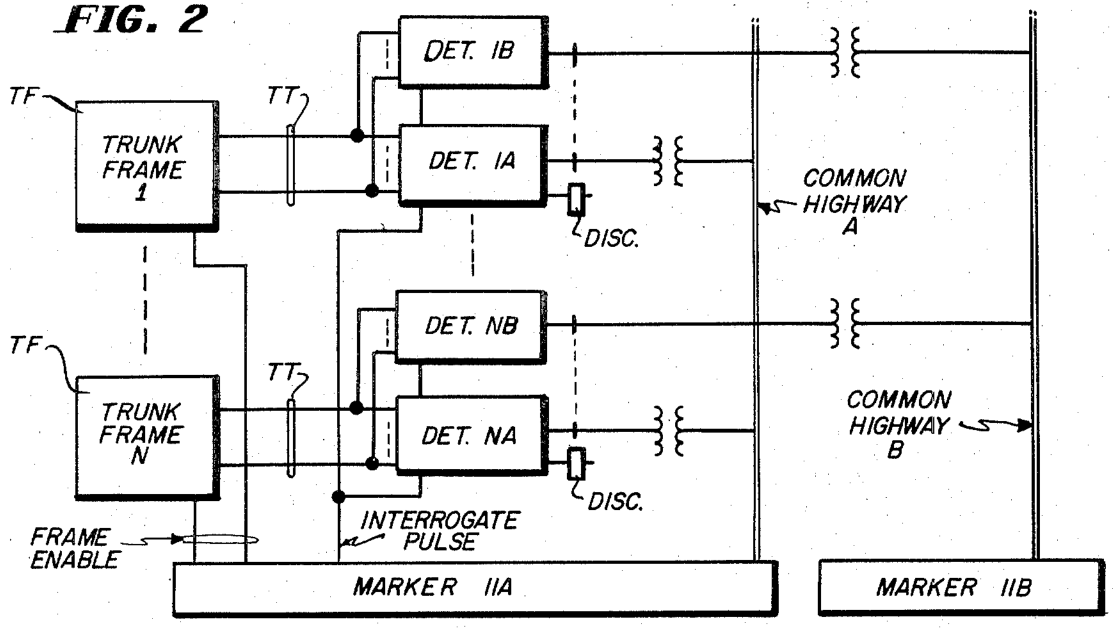
FIG. 2 is a block diagram schematic of the monitoring circuitry for protecting the common highways.
Figure 3:
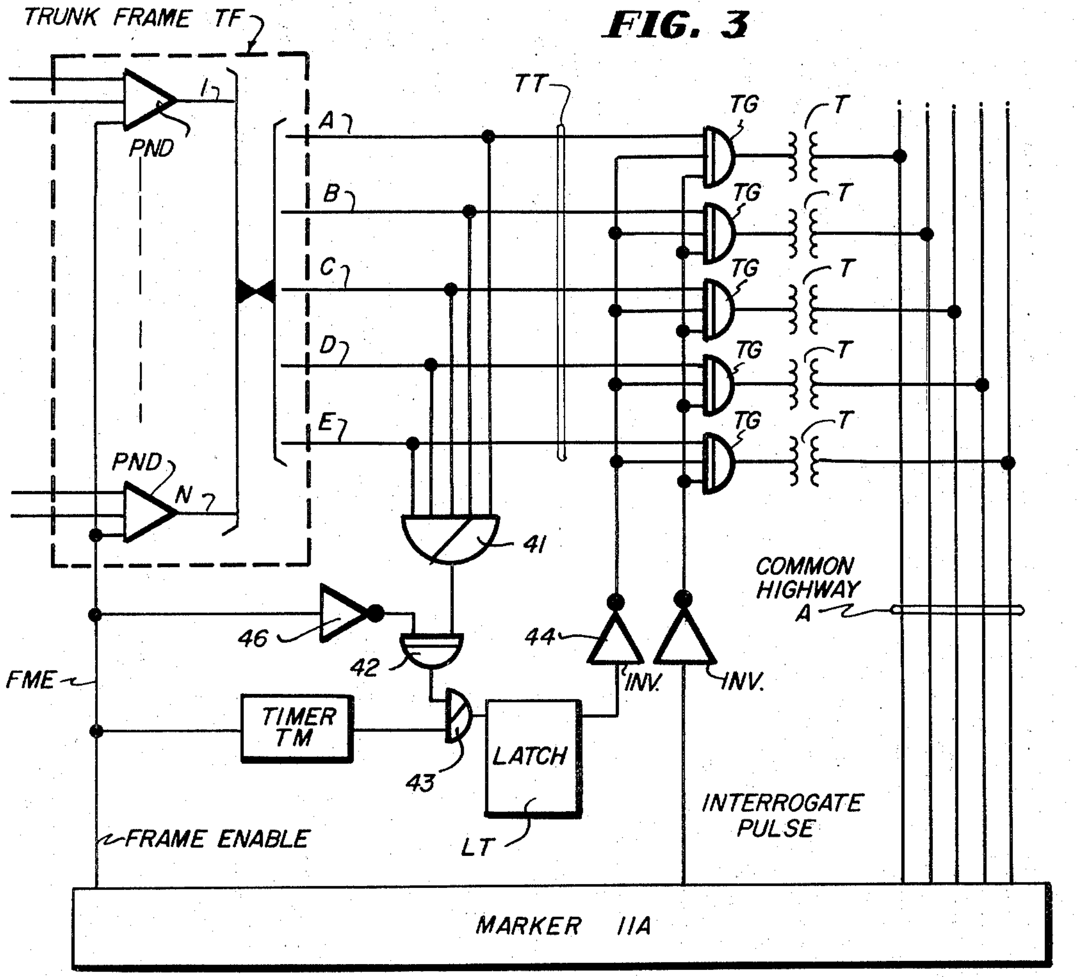
FIG. 3 is a more detailed block diagram schematic illustrating the monitoring circuitry associated with one trunk frame and one common highway.

In FIGS. 2 and 3, the manner in which the common highways are protected from false signals due to failures of the pull negative driver's PND or an extended frame enable signal is illustrated. In FIG. 2, there are illustrated a number of trunk frames TF, each of which has a pair of detector circuits A and B associated with it. These detector circuits monitor the pull negative driver PND potentials on the leads TT which are used to transmit the trunk type information from the trunks of each trunk frame over the common highways A and B to the respective markers 11A and 11B. In a system of the type described above having 2,000 inlets, 25 such trunk frames are provided, with each trunk frame having 80 trunks associated with it. The detector circuits A and B function in conjunction with the respective common highways and markers A and B, which are provided in duplicate for redundancy, as described above. Only one marker A or B is "on-line" at a time.

As indicated above, a pull negative driver PND is associated with each trunk and, when a call for service is detected and the position of the calling trunk is found, the marker operates, during mode count two, MC2, the pull negative driver PND associated with that trunk. The operated pull negative driver PND transmits a trunk type signal to the markers, via the common highways. Up to five trunk type identifications can be provided in the system.

In FIG. 3, one trunk frame and one detector circuit is illustrated in greater detail, with the illustrated detector circuit being associated with the common highway A and the marker 11A. As described above, another similar detector likewise is associated with this same trunk frame, and the common highway B and the marker 11B. Two of the 80 pull negative drivers PND associated with the trunks of the illustrated trunk frame are shown, and the outputs of all 80 pull negative drivers PND are coupled with an appropriate one of the leads TT (A–E), depending upon the particular trunk type of the trunk with which it is associated. When the pull negative driver PND associated with the selected trunk is operated, it couples a potential or signal over the lead TT with which it is connected, to the associated one of the AND gates TG. After a 500 microsecond delay, as described above, the marker couples a 1 microsecond interrogate pulse to the gates TG, to enable the gate TG to which the trunk type signal from the pull negative driver PND is coupled. The output of the enabled gate TG is coupled through the transformer T to the common highway A to the marker 11A, and by the latter to the receivers 16 to enable any receiver pool that can serve this trunk type.

It may be noted that each of the leads TT also are coupled to an OR gate 41 which has its output coupled to an AND gate 42. The frame enable lead FME also is coupled to the AND gate 42 through an inverter 46, and the latter's output is coupled to another OR gate 43. The output of the OR gate 43 is coupled to a latch LT and is operable to set this latch LT, for reasons set forth more specifically below. The frame enable lead FME also is coupled to a timer TM whose output is coupled to the OR gate 43.

With the above-described arrangement, when the frame enable signal is extended to the pull negative drivers PND within a trunk frame via the frame enable lead FME and a pull negative driver PND is enabled, the pull negative driver PND couples a signal over the lead TT to the associated one of the AND gates TG and also to the OR gate 41. At this time, the output of the OR gate 41 to the AND gate 42 is at one while the signal on the frame enable lead FME is at one, then inverted to the AND gate 42, so that the latch LT is not set. The output of the latch LT remains at zero, and is inverted by the inverter 44, so that the AND gate TG to which the signal from the enabled pull negative driver PND is coupled is enabled when the interrogate pulse is coupled to it. The trunk type signal then is coupled onto the common highway via the transformer T, in the manner described above.

However, if a pull negative driver PND fails "on," at a time when the trunk frame within which it is included is not enabled, the signal produced by it again is coupled to the AND gate TG associated with it and to the OR gate 41. At this time, the output of the OR gate 41 to the AND gate 42 goes to one, and the signal on the frame enable lead FME is at zero, so that the AND gate 42 is enabled. Its output via the OR gate 43 sets the latch LT. The output of the latch LT upon being set goes to 1, is inverted by the inverter 44, and is coupled to the AND gates TG so as to effectively block them. Accordingly, the trunk type signal is prevented from being coupled onto the common highway. This arrangement will effectively prevent any one of the trunks within the one trunk frame with which the faulty pull negative driver PND is included from being serviced until the fault is corrected. The rest of the trunk frames are not effected since the faulty pull negative driver PND is prevented from contaminating the common highways.

As indicated above, during normal operation, a frame enable lead FME is only operated for several milliseconds at a time. If this established time is exceeded, as a result of a fault condition such as a permanent on the frame enable lead FME, the output of the timer TM is coupled through the OR gate 43 to set the latch LT. Once the latch LT sets, the AND gates TG again are effectively blocked, in the manner described above.

Once the existing fault condition is corrected, the latch LT can be manually reset, to remove the blocking on the AND gates TC.

It will thus be seen that the objects set forth above, among those made apparent from the preceding description, are efficiently attained and certain changes may be made in carrying out the above method. Accordingly, it is intended that all matter contained in the above description shall be interpreted as illustrative and not in a limiting sense.

Now that the invention has been described, what is claimed as new and desired to be secured by Letters Patent is:

1. In a common control communication switching system including a plurality of trunk frames each having a plurality of trunks associated with it, at least one marker, and a common highway over which the trunk type of each of said plurality of trunks is transmitted from said trunks to said marker, an arrangement for protecting said common highway from contamination as a result of more than one trunk type signal being coupled onto said common highway at one time due to a failure of the trunk type signal generating means comprising signal generating means associated with each of said trunks for producing a signal representative of the trunk type of the trunk with which it is associated, said marker coupling a frame enable signal to all of said signal generating means associated with said plurality of trunks within one of said trunk frames to simultaneously enabled them for subsequent one at a time operation to produce a trunk type signal, a plurality of groups of gating means each associated with said plurality of trunks within one of said trunk frames, said trunk type signals being coupled to said gating means and said gating means upon being enabled coupling said trunk type signals onto said common highway, monitoring means associated with each trunk frame and included within the coupling between said signal generating means and said gating means, said gating means being enabled upon coincidence of a trunk type signal and an interrogate signal from said marker to couple said trunk type signal onto said common highway, said monitoring means monitoring the output of said signal generating means and upon detecting the presence of a trunk type signal and the absence of said frame enable signal being operated to block said group of gating means associated with a trunk frame to prevent said trunk type signal produced by said signal generating means associated with said plurality of trunks within that trunk frame from being coupled onto said common highway.

2. In the common control communication switching system of claim 1, wherein said monitoring means further monitors said frame enable signals generated by said marker, said monitoring means upon detecting the presence of a frame enable signal for longer than an established time interval being operated to block said group of gating means associated with that trunk frame to which said frame enable signal is coupled.

3. In the common control communication switching system of claim 1, wherein said monitoring means is operated to block said group of gating means until it is reset.

4. In the common control communication switching system of claim 1, wherein said monitoring means comprises latch means which is operable to provide an output signal for blocking a group of said gating means, and trigger gate means enabled to operate said latch means upon detecting a trunk type signal being coupled to at least one of said gating means within a group of said gating means and the absence of a frame enable signal.

5. In the common control communication switching system of claim 4, wherein said monitoring means further includes timing means coupled to said latch means, said frame enable signal being coupled to said timer means and said timer means operating said latch means when said frame enable signal is present for longer than an estabilished time interval.

6. In the common control communication switching system of claim 1, wherein each of said groups of gating means includes a pre-determined number of gating means, said signal generating means associated with said plurality of trunks within a trunk frame each being coupled to a pre-determined one of said gating means to thereby indicate its trunk type, said gating means upon being enabled coupling a signal onto said common highway to represent the trunk type of trunks to said marker.

7. In the common control communication switching system of claim 6, wherein each group of gating means comprises five of said gating means, whereby five different trunk types can be transmitted to said marker.

8. In the common control communication switching system of claim 1, wherein two markers are provided and a common highway is associated with each of said markers for transmitting said trunk type signals to both of said markers, said system including a duplicate monitoring arrangement for each said marker and its associated common highway, whereby a failure of one such monitoring arrangement will only effect one common highway.

* * * * *